W. K. HARRELL.

PLOW.

No. 6,804. Reissued Dec. 14, 1875.

Witnesses.
L. Van Riswick
D. G. Stuart

Inventor.
William K. Harrell
(by) A. McCallum
Atty

N. PETERS, PHOTO-LITHOGRAPHER, WASHINGTON, D. C.

UNITED STATES PATENT OFFICE.

WILLIAM K. HARRELL, OF CLARINDA, IOWA, ASSIGNOR TO HIMSELF, THOS. B. CHAMBERLAIN, AND DEWITT C. CHAMBERLAIN.

IMPROVEMENT IN PLOWS.

Specification forming part of Letters Patent No. 128,141, dated June 18, 1872; reissue No. 6,804, dated December 14, 1875; application filed November 1, 1875.

*To all whom it may concern:*

Be it known that I, WILLIAM K. HARRELL, of Clarinda, in the county of Page and State of Iowa, have invented certain new and useful Improvements in Plows; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to plows, more particularly to plows used for breaking up sod-land; and the invention consists, first, in constructing the plowshare so that it will cut the sod completely across the furrow-slice or width of the furrow before the latter begins to turn or is turned over; second, in constructing the mold-board or part of the plow which turns the sod or furrow-slice over after it is cut by the share, narrow or of less width than the share, so that it operates as a wedge to turn the sod without bearing upon its whole width, a portion only of the turning sod coming in contact with the mold-board; third, in the combination and arrangement of the broad share and narrow mold-board, and connecting them together by a comparatively narrow neck, so as to form a considerable cavity or space between the share and turning portion of the mold-board, in which space the sod, after it is cut by the share, rests until turned over by the mold-board or turning device, all as hereinafter more fully set forth.

Figure 1:
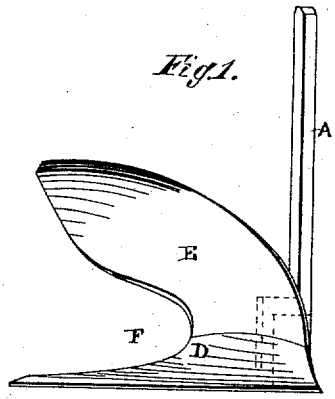
Figure 2:
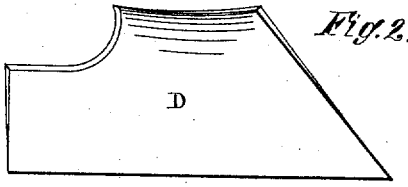
Figure 3:
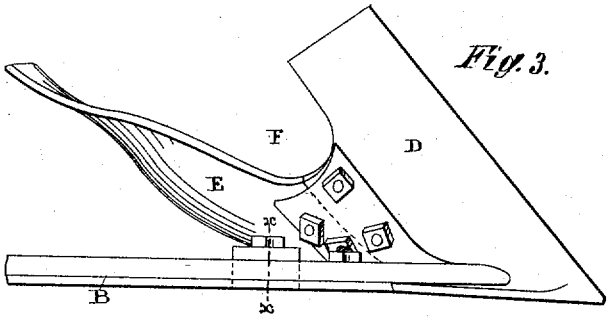
Figure 4:
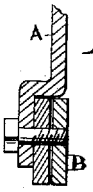

In the accompanying drawings, Figure 1 is a front view of my improved sod-plow. Fig. 2 is a detached view of the share. Fig. 3 is a bottom view of the plow; and Fig. 4 is a sectional view taken in the line *x x*, Fig. 3.

Referring to the parts by letters, A represents the standard, B the land-side, D the share, and E the mold-board or device for turning the sod. The share D is made flat and broad, its cutting-edge diverging from the land-side at a considerable angle, so as to cut the sod easily and completely across without raising or turning it. The rear end of the share is cut away, the point of contact with the mold-board being a narrow neck, so as to form a considerable space or cavity, F, between it and the mold-board. The mold-board or turning device is made narrow, or of less width than the share, and twisted, or of spiral form, so as to operate like a wedge to turn the sod after it is completely severed, by coming in contact only with that portion which is next the land-side, the other portion of the cut sod resting on the ground in the space or cavity F, between the share and mold-board.

With a plow of this construction less draft-power is required to operate it, as there is no tearing or forcible rupture of the roots of the sod by the operation of the mold-board. The roots of the sod are cut completely across the furrow-slice before any portion of it comes in contact with the mold-board, and, as only a portion of the furrow-slice comes in contact with the mold-board, the latter does not bear against its whole width, and the plow consequently meets with but little resistance.

A portion only of the sod rests upon the ground after it is cut, and the function of the mold-board is simply to turn the furrow-slice over.

Having thus described my invention, what I claim as new, and desire to secure by Letters Patent, is—

1. In a sod-plow, the flat extended share D, adapted to cut the sod completely across the width of the furrow before it begins to turn or is turned over, substantially as set forth.

2. In a sod-plow, the narrow mold-board or turning device, adapted to turn the sod after it is cut without bearing upon its whole width, substantially as set forth.

3. The combination, in a sod-plow, of a flat extended share for cutting the sod completely across the furrow in advance of the mold-board, and a narrow mold-board or turning device which turns the sod without bearing upon its whole width, substantially as set forth.

In testimony that I claim the foregoing I have hereunto set my hand this 5th day of October, 1875.

WM. K. HARRELL.

Witnesses:
W. M. ALEXANDER,
ISAAC DAMEWOOD.